Jan. 31, 1950 V. B. KING 2,495,898
UNLOADING APPARATUS FOR VEHICLES
Filed Oct. 10, 1947 5 Sheets-Sheet 3
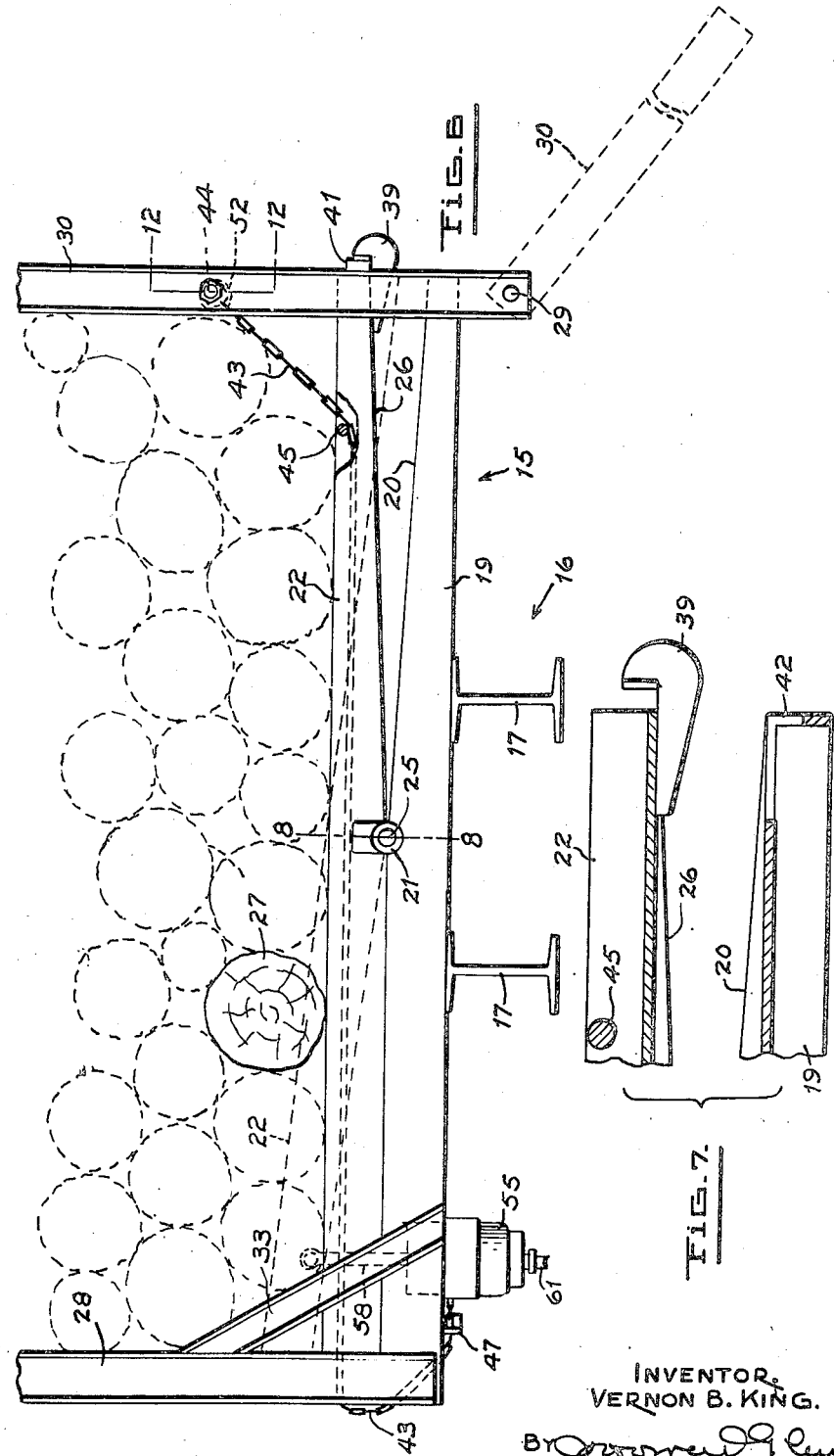
INVENTOR.
VERNON B. KING.
ATTORNEY.

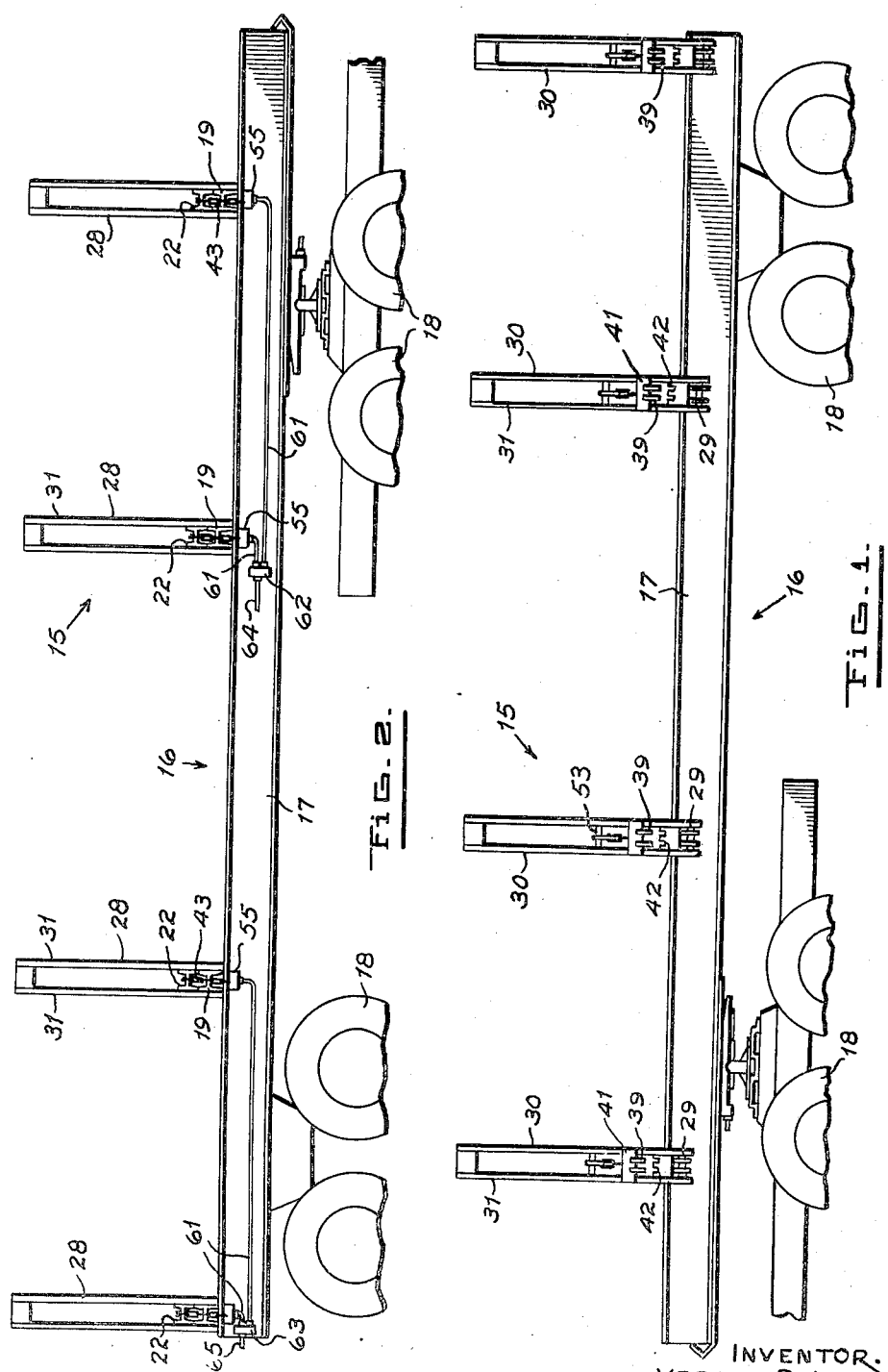

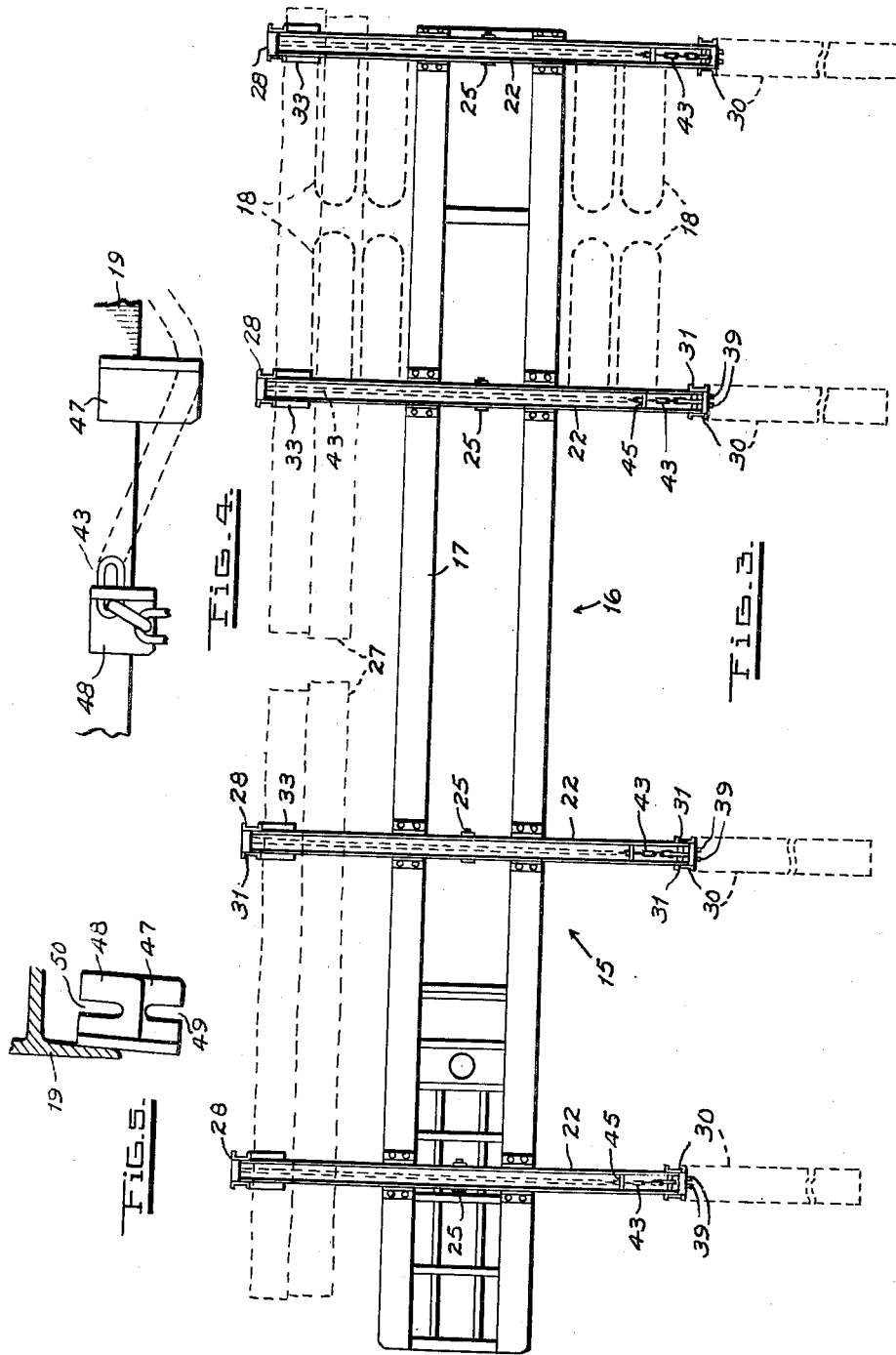

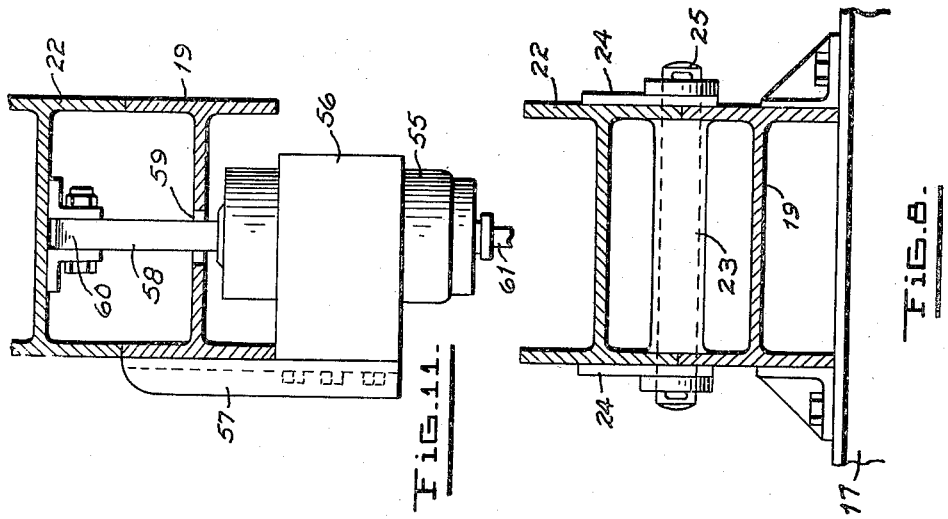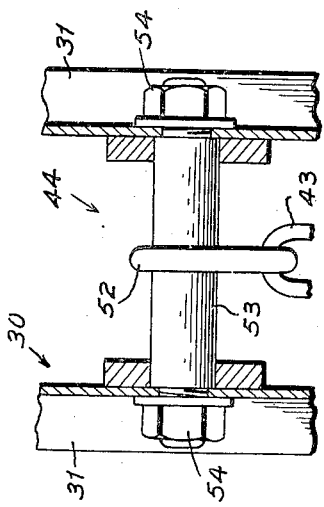

Jan. 31, 1950  V. B. KING  2,495,898
UNLOADING APPARATUS FOR VEHICLES
Filed Oct. 10, 1947  5 Sheets-Sheet 5
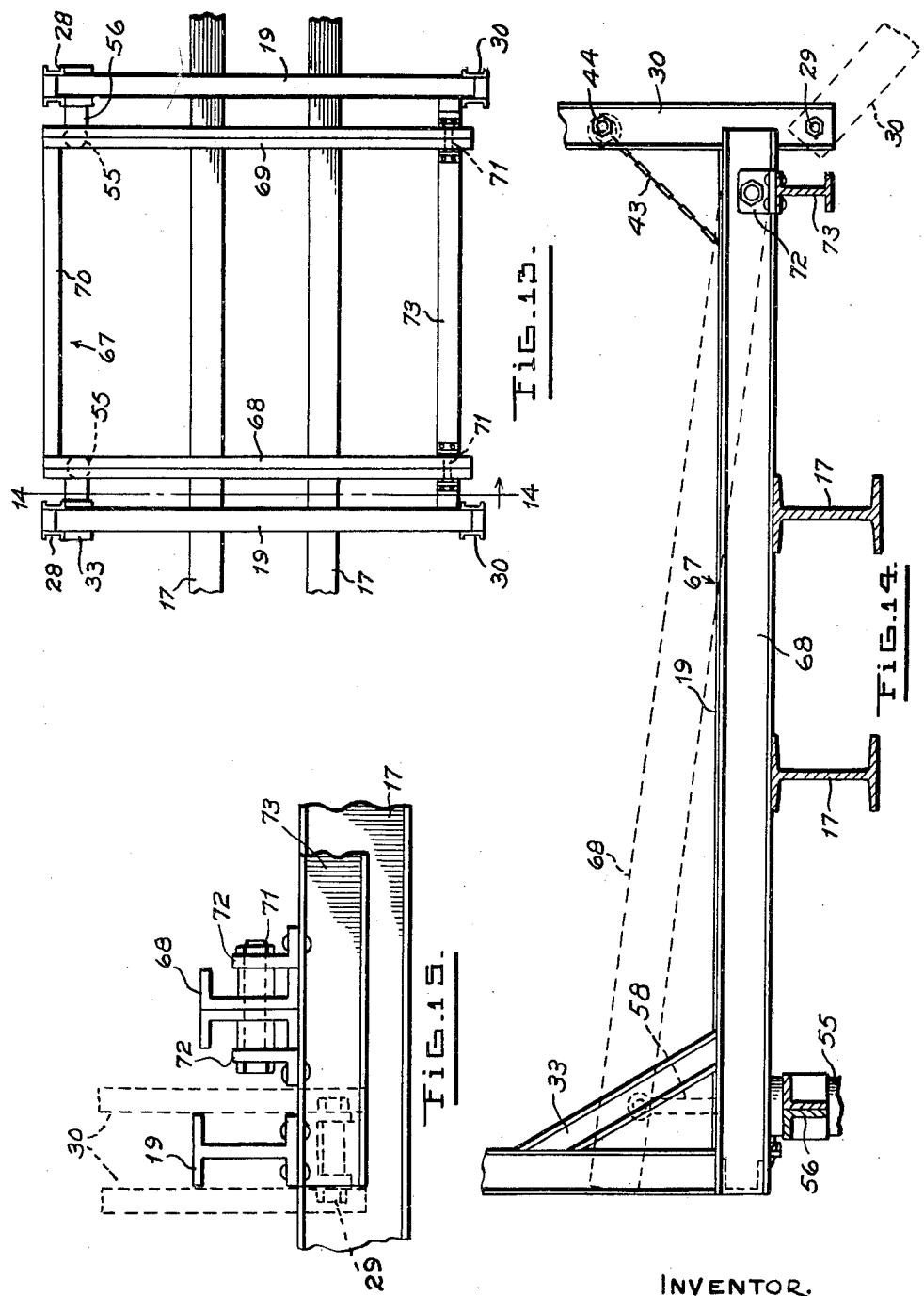
INVENTOR.
VERNON B. KING.
ATTORNEY.

Patented Jan. 31, 1950

2,495,898

UNITED STATES PATENT OFFICE 2,495,898

UNLOADING APPARATUS FOR VEHICLES

Vernon B. King, Woodstock, Ontario, Canada

Application October 10, 1947, Serial No. 779,063

4 Claims. (Cl. 280—145)

This invention relates to new and useful improvements in unloading apparatus for vehicles.

One of the objects of the present invention is to provide a device of this character wherein logs, lumber and other materials may be conveniently unloaded at one side of and free of the vehicle.

Another object of the present invention is to provide a device of this character wherein certain standards are arranged on the side of the vehicle in such a manner that in one position they retain materials on the vehicle and in another position they function as an unloading ramp.

A further object of the present invention is to provide a device of this character wherein mechanism is operable for selectively releasing certain of the uprights or standards for unloading purposes.

Still another object of the present invention is to provide a device of this character wherein a series of movable bolster members, when released, are automatically tilted from a substantially horizontal position to a sloping angle for material unloading purposes.

Yet another object of the present invention is to provide a device of this character in which the release of the standards or uprights for unloading purposes is effected by remote control to avoid the hazard of accident normally involved in manual release.

Still a further object of the present invention is to provide a device of this character wherein the uprights or standards are a connected part of the vehicle and when in unloading position insure that logs being unloaded are conducted free of the vehicle and running gear to guard against damage to the vehicle during unloading operations.

Another and still further object of the present invention is to provide a device of this character which is novel yet simple structure, rugged in nature and one that will the more efficiently and effectively perform the functions required of it.

Having regard to the foregoing and other objects and advantages which will become apparent as the description proceeds and the details of the invention become known, the invention consists essentially in the novel combination and arrangement of parts hereinafter described in more particular detail and illustrated in the accompanying drawings in which;

Fig. 1 is a side elevational view disclosing an embodiment of the present invention as viewed from the left-hand side of the vehicle.

Fig. 2 is a view similar to Fig. 1 as viewed from the right-hand side of the vehicle.

Fig. 3 is a plan view of Fig. 1 with the movable uprights or standards shown in dotted lines in ramp forming position.

Fig. 4 is a side elevational view of the releasable locking means for retaining the upright members in a vertical position on the vehicle.

Fig. 5 is an end view of Fig. 4.

Fig. 6 is an enlarged front and elevational view of the present invention with the running gear removed.

Fig. 7 is an enlarged sectional view of the ends of the movable bolster and supporting structure with standard engaging hook members.

Fig. 8 is an enlarged sectional view taken on the line 8—8 of Fig. 6.

Fig. 9 is an enlarged side view of the supporting structure to which the movable upright is pivotally connected.

Fig. 10 is a section taken on the line 10—10 of Fig. 9.

Fig. 11 is an enlarged end view of the supporting structure and movable bolster partly in section showing the cylinder for operating the movable bolster.

Fig. 12 is a section taken on the line 12—12 of Fig. 6.

Fig. 13 is a plan view of a modified form of the present invention.

Fig. 14 is an enlarged section taken on the line 14—14 of Fig. 13, and

Fig. 15 is a view looking at the right-hand side of Fig. 14 showing a fragmentary portion of the device and illustrating the pivotal mounting of the tiltable platform frame and the pivotal mounting of the ramp forming members.

Referring now to the accompanying drawings wherein an embodiment of the present invention is disclosed and wherein like numerals of reference designate corresponding parts in the various illustrations, the numeral 15 indicates the present invention as a whole operatively mounted on a trailer or vehicle 16.

In the present instance the invention is shown as applied to a trailer or truck however it is to be clearly understood that the present disclosure may be applied to other types of transportation such as railway cars, etc., without departing from the spirit or scope of the invention.

The trailer, generally speaking, comprises a chassis or frame 17 preferably constructed of metal such as I beams and channels and provided with running gear presently indicated in the form of wheels 18.

Mounted on the frame or chassis is the bolster supporting structure which is illustrated as comprising a series of fixed support members 19 arranged in spaced relationship to one another to form a fixed platform.

The upper surface of the members 19 is formed with an angularly arranged or sloping surface which extends from substantially midway of these members to one end thereof as indicated at 20, the purpose of which will be later referred to.

Mounted on the supporting members 19 and pivotally connected thereto as at 21 are the tiltably movable bolsters 22. As exemplified in Fig. 8, a sleeve or the like 23 is welded or otherwise connected to the members 19 while the movable bolster is provided with orificed strap members 24. A pivot pin 25 extends through the straps and sleeve member thus pivotally connecting the movable bolster members to the fixed supporting structure. Additionally, the lower side or base of the movable bolster members is formed with a sloping or angular surface indicated at 26 which extends from substantially midsection to one end thereof and corresponding to the reversely sloping surface of members 19. Thus an elongated substantially V shape opening is formed between the fixed supporting structure and the tiltable bolsters at one side thereof which permits the movable bolsters to be tilted to a sloping angle on its pivotal point 25.

From what has thus far been described it will be seen that the bolster members 22 may be tilted or rocked on their pivotal mountings from a substantially horizontal position to a sloping angle in platform form and by reason of the tilted angle of the platform, materials thereon, such as logs 27, may roll downwardly over the sloping surface of the movable bolsters 22.

Secured to one end of each of the fixed support members 19 is a fixed standard or upright 28 while connected to the opposite ends of the supports as indicated at 29 are the pivotally mounted standards or uprights 30. The standards 28 and 30 preferably comprise pairs of channel members 31 connected in spaced relationship and designed to straddle the movable bolsters in order that they may move upwardly and downwardly therebetween.

The fixed standards are preferably secured to the supporting structure 19 as by welding or other appropriate means while the movable or swingable standards 30 are pivotally connected to members 19 as previously mentioned. Suitable brace members 33 are connected to the standards 28 and members 19 for reinforcement purposes while the pivotal support 29 for the swingably mounted standards comprises pairs of orificed strap members 34 welded or otherwise secured to the lower side of the members 19 and provided with sleeve members 35 through which the pivot pin 37 extends to pivotally support the standards.

The means for retaining the pivotally or swingably mounted standards in a normally upright and material holding position comprises a pair of hook members 39 preferably welded to the underside of the web of the I beam or bolster 22 (see Figs. 1, 6 and 7). These hook members are designed to engage a holding plate 41 which is fixedly secured to standards 30. When released, the hook members 39 move downwardly with members 22 free of the holding plate where the base of the hooks is accommodated in recesses 42 formed in the supports 19. Thus when the movable bolsters are in a tilted position, the sloping surfaces 20 and 26 rest one upon the other with the hook members occupying recesses 42 while the upper surface of the movable bolsters is moved to a sloping position. A further means of retaining and locking the swingable standards in an upright position comprises a chain or other appropriate securing medium 43 connected as at 44 to standards 30 and is designed to provide a primary locking means.

As more clearly shown in Fig. 6, the chain 43 extends downwardly at an angle from its fixed connection on the swingable standards 30, then under transverse bar 45 and along the channel forming portion of the bolster to the opposite side where it passes freely between the arms 31 of the fixed standards 28 after which it extends under and over fixed bracket members 47 and 48 (see Figs. 4, 5 and 6). These two brackets are provided with reversely arranged recesses 49 and 50 for the reception of the chain links of chain 43 while the free end of the chain may hang downwardly from bracket 48 and thus may readily be released from bracket engagement by hand.

By referring to Fig. 12, it will be seen that one end of chain 43 is provided with a ring 52 which is connected to cross pin 53, the cross pin in turn being detachably secured to the uprights or standards by means of nuts 54. Should it become necessary or expedient to remove or replace the chain, this may be effected by simply releasing one of the holding nuts 54, sliding the cross pin outward and then removing or replacing the chain as required.

In order to simultaneously tilt the movable bolsters and release the swingable standards, a series of fluid operated cylinders 55 is provided (see Figs. 6 and 11). These cylinders are conveniently located at one end underneath the supporting structure 19 and are connected thereto by means of a band 56 and strap 57. A piston connecting rod 58 extends upwardly through an orifice 59 in member 19 and is pivotally connected to the movable bolster as indicated at 60. A conduit 61 is designed to connect the cylinders 55 with a suitable source of fluid pressure such for example as a valve controlled air pressure tank or the like.

For operative purposes the conduits 61 may be connected to the cylinders for individual operation or they may be connected in pairs with a source of fluid pressure as required or necessity demands. In the present instance, the conduits are shown coupled in tandem to a common control unit or units 62 and 63 which in turn are connected with individual conduits 64 and 65. By this particular arrangement then the swingable uprights or standards may be selectively released in pairs.

In the modified form of the invention illustrated in Figs. 13, 14 and 15, the tiltable platform frame 67 is pivotally mounted at one side of the vehicle and preferably, the height of the frame in normal position is slightly less than the height of the fixed members 19 so that when the vehicle is loaded the weight of the load is supported by the fixed members 19 during transportation. In structure then the tiltable platform frame comprises pairs of joined channel members 68 and 69 having a height slightly less than members 19, connected as indicated in Fig. 13 by means of cross brace 70. The tiltable frame is pivotally mounted on bracket members 72 as indicated at 71, the brackets being mounted on longitudinal support 73 which in turn is secured to the underside of the fixed support members 19.

At the opposing side of frame 67 and pivotally connected therebeneath are the piston rods 58 while the pistons 55 for operating the rods are supported by the strap members 56, the strap members in turn being secured to the fixed members 19.

From the foregoing it will be seen that upon release of the chain or like holding means 43 and the operation of the pistons 55, the ramp forming members will move downwardly to a sloping position and one end of the platform frame 67 will move upwardly as shown in dotted lines in Fig. 14. Thus with the platform tilted at an angle to the horizontal on the chassis and the ramp forming members sloping downwardly, logs or the like will automatically roll downwardly and outwardly where they are unloaded free of the vehicle.

In operation and with the vehicle in normally loaded form, the movable bolsters are in a horizontal plane with the swingable standards in an upright position with the hook members 39 in engagement with the standard holding blocks and chain 43 in engagement with bracket members 47 and 48. In order to tilt the movable bolsters and release the swingable standards, the free ends of chain 43 are first manually released from brackets 47 and 48. Fluid pressure is then transmitted to the cylinders from a pressure tank by way of conduits 64 or 65 as the case may be. With pressure admitted to the cylinders, the connecting rods 58 will move a pair of the movable bolsters 22 upwardly at one end and downwardly at the opposite end, the downwardly moving end carrying hook members 39 therewith will disengage the holding bar members 41 permitting the swingable standards to move downwardly to the sloping position shown in dotted lines in Figs. 3 and 6 where they form an inclined ramp or unloading platform extending outwardly free of the vehicle and running gear. Thus with the movable bolsters tilted at an angle and the uprights in sloping ramp form, logs or the like are free to roll over the sloping surfaces to be unloaded free of the vehicle and running gear.

When the unloading operation is complete, the swingable standards or uprights are restored to an upright position. The fluid pressure in the cylinders is then released when the movable bolster members return to their normally horizontal position. As the bolster members return to their normal position, the hook members 39 re-engage the holding blocks of the upright members after which the chain 43 is again secured in the bracket members 47 and 48.

Many changes may be made in the above and many apparently widely different embodiments constructed without departing from the spirit or the essential characteristics of the invention. The present disclosure therefore is intended to be interpreted as illustrative and not in a limiting sense.

What I claim as my invention is:

1. In unloading apparatus for vehicles of the character described, a supporting frame provided with wheels and bolster supporting structure, tiltable bolster members pivotally mounted on the supporting structure, upright standards arranged on opposite sides of the supporting structure with at least one pair of the said standards pivotally connected to the said structure with one end thereof swingable downwardly to the ground to form an unloading ramp between one side of the vehicle and the ground releasable means carried by the tiltable bolsters for engaging the swingable upright standards for retaining them in an upright position, supplementary means for locking the swingable standards in an upright position and means for simultaneously tilting the movable bolsters and releasing the swingable standards to form a combined sloping platform on the vehicle and a sloping unloading ramp at the side of the vehicle between the vehicle and the ground for unloading materials at one side of the vehicle.

2. In unloading apparatus for vehicles of the character described, a supporting frame provided with wheels and bolster supporting structure, movable bolsters pivotally mounted on the supporting structure, the said supporting frame having an upper surface sloping downwardly from the pivotal point to one end thereof to form a base support for the bolsters when in a tilted position, a series of upright standards fixedly connected to one side of the supporting structure with a series of swingable standards pivotally connected on the opposite of the said structure, the said swingable standards being movable downwardly to form an unloading ramp extending between the vehicle and the ground releasable means for engaging the swingable standards to retain them in an upright position, cylinder operated means for tilting the movable bolsters and causing them to move to a sloping position on the vehicle and simultaneously releasing the swingable standards to permit the said standards to move to a sloping ramp forming position between one side of the vehicle and the ground for unloading materials at one side of the vehicle.

3. In unloading apparatus for vehicles of the character described, a supporting frame provided with bolster supporting structure, movable bolster members pivotally mounted on the supporting structure the said bolster members having a lower surface sloping upwardly from the pivotal point to one end thereof to form a sloping base for engagement with the bolster support when in a tilted position, a series of upright standards fixedly secured to one side of the supporting structure and a series of movable standards pivotally mounted on the opposite side of the supporting structure, the said movable standards being swingable downwardly to form an unloading ramp between one side of the vehicle and the ground, fluid operated means for selectively tilting the movable bolsters and releasing the swingable standards in pairs to provide a sloping platform on the vehicle and a sloping ramp and vehicle support at one side thereof between the vehicle and the ground for unloading materials at one side of the trailer or vehicle.

4. In unloading apparatus for vehicles of the character described, a supporting frame provided with bolster supporting structure, tiltable bolster members pivotally mounted on the supporting structure provided with standard engaging lock means, a series of upright standards fixedly connected to one side of the supporting structure and a series of movable standards pivotally connected to the opposite side of the supporting structure, the said upright standards being swingable downwardly to form an unloading ramp, fluid operated means carried by the supporting structure for tilting the movable bolsters and simultaneously releasing the standard lock engaging means, auxiliary means for releasably locking the swingable standards in an upright position, selective control means connecting the fluid operated means in tandem for simultaneously tilting the movable bolsters in pairs and releasing the swingable standards in pairs to form a sloping platform on the vehicle and a sloping ramp at the side thereof for unloading materials.

VERNON B. KING.

REFERENCES CITED

The following references are of record in the file of this patent:

UNITED STATES PATENTS

| Number | Name | Date |
|---|---|---|
| 1,392,419 | Jones | Oct. 4, 1921 |